United States Patent
Cheney et al.

(10) Patent No.: US 8,003,149 B2
(45) Date of Patent: Aug. 23, 2011

(54) PROCESS AND APPARATUS FOR MOULDING A FROZEN AERATED PRODUCT

(75) Inventors: Paul Edward Cheney, Sharnbrook (GB); Stephen John Dyks, Sharnbrook (GB)

(73) Assignee: Conopco, Inc., Englewood Cliffs, NJ (US)

( * ) Notice: Subject to any disclaimer, the term of this patent is extended or adjusted under 35 U.S.C. 154(b) by 791 days.

(21) Appl. No.: 12/002,685

(22) Filed: Dec. 18, 2007

(65) Prior Publication Data

US 2008/0175973 A1 Jul. 24, 2008

(30) Foreign Application Priority Data

Dec. 21, 2006 (EP) ..................... 06126944

(51) Int. Cl.
*A23G 3/02* (2006.01)
*B65B 1/04* (2006.01)

(52) U.S. Cl. ............ 426/512; 141/11; 141/82; 141/392; 249/92; 426/101

(58) Field of Classification Search ............ 141/11, 141/82, 98, 392; 426/100–101, 512; 249/92
See application file for complete search history.

(56) References Cited

U.S. PATENT DOCUMENTS

| | | | | |
|---|---|---|---|---|
| 3,971,853 A | * | 7/1976 | Crowder | 426/249 |
| 4,116,369 A | * | 9/1978 | Crowder | 222/145.3 |
| 4,477,473 A | * | 10/1984 | Schoonmaker et al. | 426/231 |
| 4,746,523 A | * | 5/1988 | Binley | 426/249 |
| 4,767,307 A | * | 8/1988 | Beer | 425/394 |
| 5,156,008 A | * | 10/1992 | Olsson et al. | 62/63 |
| 5,359,858 A | * | 11/1994 | Miller et al. | 62/71 |
| 5,693,355 A | * | 12/1997 | Haas | 426/523 |
| 5,738,895 A | * | 4/1998 | Fuchs et al. | 426/515 |
| 5,843,512 A | * | 12/1998 | Daouse et al. | 426/512 |
| 5,948,456 A | * | 9/1999 | Jones et al. | 426/100 |
| 2002/0018833 A1 | * | 2/2002 | Cathenaut et al. | 426/512 |

(Continued)

FOREIGN PATENT DOCUMENTS

CA 2387588 C 2/2006

(Continued)

OTHER PUBLICATIONS

European Search Report Application No. EP 06126944 completed May 23, 2007.

(Continued)

*Primary Examiner* — Gregory L Huson
*Assistant Examiner* — Nicolas A Arnett
(74) *Attorney, Agent, or Firm* — Michael P. Aronson

(57) ABSTRACT

Process for moulding a frozen aerated product including the step of filling a mould cavity with a frozen aerated product through a filling member; the mould cavity being a recess on a mould surface; the mould surface being at a temperature of below 0° C.; the filling member having an end part through which the ice cream is dispensed into the mould cavity; the end part being in contact with the mould surface; wherein the filling member includes a thermal insulation located at the end part of the filling member in contact with the mould surface; the thermal insulation being constituted by a material having a thermal conductivity of less than 2 W m−1 K−1; and the filling member being heated by a heating member upstream of the thermal insulation.

7 Claims, 1 Drawing Sheet

U.S. PATENT DOCUMENTS

2004/0071834 A1* 4/2004 Dyks et al. .................... 426/100

FOREIGN PATENT DOCUMENTS

| EP | 0864256 A | 9/1998 |
|---|---|---|
| EP | 0 582 327 B1 | 9/1999 |
| EP | 0 827 696 B1 | 3/2004 |
| FR | 2799614 A1 | 4/2001 |
| GB | 2134438 A | 8/1984 |
| WO | 90/06693 | 6/1990 |
| WO | 2004/017748 A | 3/2004 |

OTHER PUBLICATIONS

PCT International Preliminary Report on Patentability for International Application No. PCT/EP2007/062916 dated Jun. 23, 2009.

* cited by examiner

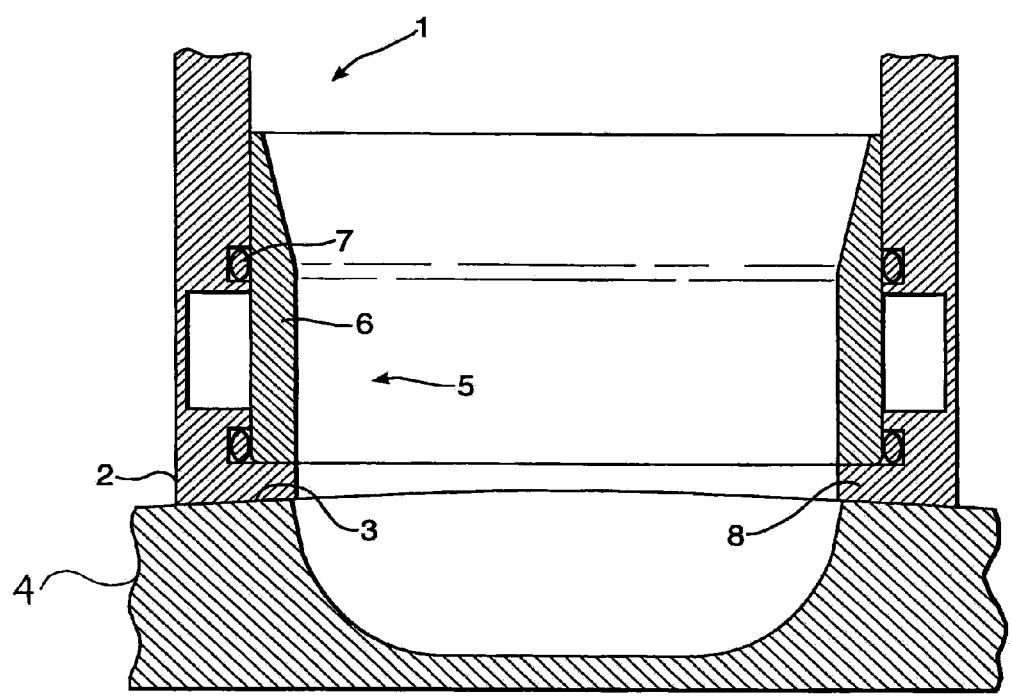

PROCESS AND APPARATUS FOR MOULDING A FROZEN AERATED PRODUCT

TECHNICAL FIELD OF THE INVENTION

The present invention relates to a process and an apparatus for moulding a frozen aerated product. The present invention more particularly relates to the moulding of ice cream in cryogenically cooled moulds.

BACKGROUND OF THE INVENTION

Moulded ice creams have been produced for decades wherein a frozen aerated ice cream is filled in a mould the resulting product being then de-moulded. The problem with such technologies is that the resulting product sticks to the mould surface. Various solutions have been presented ranging from reheating the mould surface to using a film between the mould surface and the ice cream product.

More recently, it has been discovered that if the mould is at a sufficiently low temperature, typically below 60° C., preferably below 80° C., the ice cream product does not stick to the mould any longer. Such a phenomenon as for example been described in WO90/06693, EP582327, and EP 827,696. In these processes the mould is generally cooled with liquid nitrogen.

Whereas, the use of a cryogenically cooled moulds solved the problem of the adhesion of the ice cream to the mould, it creates another one. If the mould is filled through a nozzle which touches it (for example in order to fill a close cavity and to prevent the ice cream from flowing out of the cavity), the nozzle, through heat exchange with the cryogenically cooled mould, sees its temperature dropping up to the point where the ice cream freezes inside the nozzle and does not flow anymore out of the nozzle into the cavity. The problem becomes very significant when the mould temperature drops below −20° C. and extremely acute when the temperature drops below −40° C.

Trying to solve this problem, the applicant found that simply heating the nozzle does not work since, it creates a temperature gradient between the heating means and the mould. In this temperature gradient there is a zone which is at a temperature wherein the ice cream will adhere to the nozzle.

It has now been found that a careful design of the nozzle together with specific operating conditions allow for this problem to be solved.

GENERAL DESCRIPTION OF THE INVENTION

It is a first object of the present invention to provide a process for filling a mould cavity with a frozen aerated product through filling means
  the mould cavity being a recess on a mould surface
  the mould surface being at a temperature of below 0° C.
  the filling means having an end part through which the ice cream is dispensed into the mould cavity,
  the end part being in contact with the mould surface
characterised in that
  a thermal insulation is located at the end part of the filling means in contact with the mould surface.
  the thermal insulation being constituted by a material having a thermal conductivity of less than 2 W m−1 K−1 (preferably less than 0.5 W m−1 K−1).
  the filling means being heated by heating means upstream of the thermal insulation.
By having the heating means upstream of the thermal insulation, it is enough, in order to avoid freezing of the ice frozen aerated product inside the filling means, to use a gentle heating of the inside surface of the filling means in contact with the frozen aerated product. Preferably the inside surface is heated to a temperature below 40° C., preferably above 20° C. Moreover, the heating taking place very close to the extremity of the filling means, a very steep temperature gradient is created which is so narrow that the actual zone in which the ice cream would stick to the filling means is restricted to a very small area and, owing to the ice cream flow, the ice cream effectively does not adhere.

It is a second object of the invention to provide an apparatus for filling a mould cavity with a frozen aerated edible product through filling means
  the mould cavity being a recess on a mould surface
  the mould surface being at a temperature of below 0° C.
  the filling means having an end part through which the ice cream is dispensed into the mould cavity, the end part being in contact with the mould surface;
wherein the filling means comprises:
  a thermal insulation being located at the end part of the filling means in contact with the mould surface;
  the thermal insulation being constituted by a material having a thermal conductivity of less than 2 W m−1 K−1 (preferably less than 0.5 W m−1 K−1);
  the filling means comprising heating means upstream of the thermal insulation.

In a preferred embodiment of the invention, the end of the filling means contacting the mould surface is made of a thermally insulating material and the thermal insulation has a thickness, as measured between the heating means and the mould surface, comprised between 0.5 mm and 5 mm (preferably between. 1 mm and 2 mm)

In another preferred embodiment of the invention, the thermal insulation consists in a layer of thermally insulating material, fitted to the end of the filling means facing the mould surface, the thermal insulation having a thickness comprised between 0.5 mm and 5 mm (preferably between. 1 mm and 2 mm).

Preferably the heating means comprise a channel though which a heating fluid is circulated. More preferably this heating fluid is hot air.

DETAILED DESCRIPTION OF THE INVENTION

The present invention will be further described with reference to the sole FIGURE which represents a partial cross section of a mould cavity and its filling means.

Filling means are constituted by a nozzle 1, with one extremity 2 touching the mould surface 3 of a mould 4. Heating means 5 in the form of a copper ring 6 and an air channel 7 are located inside the nozzle separated from the mould by insulated material 8.

In the preferred embodiment described in the sole FIGURE, the whole end of the nozzle 1 is constituted by the insulated material. In another preferred embodiment, the insulated material is limited to the end extremity of the nozzle between the heating means 5 and the mould surface 3.

When the nozzle 1 is facing a mould cavity, ice cream flows from the nozzle into the cavity.

The invention claimed is:

1. An apparatus for filling a mould cavity with a frozen aerated product, comprising a filling means;
  the mould cavity being a recess on a mould surface;
  the mould surface being at a temperature of below 0° C.;
  the filling means having an end part through which the ice cream is dispensed into the mould cavity, the end part being in contact with the mould surface;

the filling means comprising:
- a thermal insulation being located at the end part of the filling means in contact with the mould surface;
- the thermal insulation being constituted by a material having a thermal conductivity of less than 2 W m−1 K−1,
- heating means upstream of the thermal insulation.

2. Apparatus according to claim 1 wherein the thermal conductivity is less than 0.5 W m−1 K−1.

3. Apparatus according to claim 1 wherein the thermal insulation has a thickness comprised between 0.5 mm and 5 mm,.

4. Apparatus according to claim 1 wherein the heating means comprises a channel through which a heating fluid is circulated.

5. A process for moulding a frozen aerated product comprising the step of filling a mould cavity with a frozen aerated product through a filling means;
- the mould cavity being a recess on a mould surface;
- the mould surface being at a temperature of below 0° C.;
- the filling means having an end part through which the frozen aerated product is dispensed into the mould cavity;
- the end part being in contact with the mould surface;

wherein the filling means comprises:
- a thermal insulation being located at the end part of the filling means in contact with the mould surface;
- the thermal insulation being constituted by a material having a thermal conductivity of less than 2 W m−1 K−1;
- the filling means being heated by heating means upstream of the thermal insulation.

6. Process according to claim 5 wherein the thermal conductivity less than 0.5 W m−1 K−1.

7. Process according to claim 5 wherein an inside surface of the filling means is heated to a temperature below 40° C.

* * * * *